(12) United States Patent
Dribinski et al.

(10) Patent No.: US 11,582,114 B2
(45) Date of Patent: Feb. 14, 2023

(54) METHOD AND SYSTEM OF MANAGING RADIO CONNECTIVITY OF A VEHICLE

(71) Applicant: CELLWIZE WIRELESS TECHNOLOGIES LTD., Ramat-Gan (IL)

(72) Inventors: Daniel Dribinski, Rishon Lezion (IL); Sasi Geva, Ein Vered (IL); Ori Goshen, Tel Aviv (IL); David Pavel Khemelevsky, Alfei-Menashe (IL)

(73) Assignee: QUALCOMM Incorporated, San Diego, CA (US)

(*) Notice: Subject to any disclaimer, the term of this patent is extended or adjusted under 35 U.S.C. 154(b) by 8 days.

(21) Appl. No.: 17/033,663

(22) Filed: Sep. 25, 2020

(65) Prior Publication Data

US 2021/0014134 A1 Jan. 14, 2021

Related U.S. Application Data

(60) Division of application No. 16/670,868, filed on Oct. 31, 2019, now Pat. No. 10,868,733, which is a (Continued)

(51) Int. Cl.
*H04L 12/26* (2006.01)
*H04L 41/5009* (2022.01)
(Continued)

(52) U.S. Cl.
CPC .......... *H04L 41/5009* (2013.01); *G07C 5/008* (2013.01); *H04W 4/48* (2018.02); (Continued)

(58) Field of Classification Search
None
See application file for complete search history.

(56) References Cited

U.S. PATENT DOCUMENTS

| 9,578,580 B1 | 2/2017 | Ishfaq et al. |
| 10,681,567 B2 | 6/2020 | Kovacs et al. |

(Continued)

OTHER PUBLICATIONS

Xu Ke et al: A Fast Cloud-Based Network Selection Scheme Using Coalition Formation Games in Vehicular Networks:, IEEE Transactions on Vehicular Technology, IEEE Service Center, Piscataway, NJ, US, 64:11, Nov. 1, 2015, pp. 5327-5339.

(Continued)

*Primary Examiner* — Zewdu A Beyen
(74) *Attorney, Agent, or Firm* — Danai Nelisile Mhembere

(57) ABSTRACT

There are provided a method of managing radio connectivity of a vehicle and a system thereof. The method comprises: continuously receiving by vehicle's telematic system a predictive model generated by remote system using data continuously collected from a plurality of vehicles, wherein the collected data comprise, for each given vehicle of the plurality of vehicles, data informative of its location, speed and of Radio Access Technology (RAT)-related measurements; and, responsive to a predefined event, applying, by the telematic system, a lastly received predictive model to current values of a predefined set of inputs associated with the vehicle to obtain instructions and respectively provide corrective actions related to radio connectivity of the vehicle. The corrective actions include modifying RRC measurement report(s) so as to force the cellular network to provide one of: intra-RAT handover, inter-RAT handover; excluding available connectivity with undesired RAT or band; and terminating the radio connectivity with further RAT re-selecting.

12 Claims, 11 Drawing Sheets

Related U.S. Application Data continuation of application No. PCT/IL2018/050535, filed on May 16, 2018.

(60) Provisional application No. 62/507,258, filed on May 17, 2017.

(51) Int. Cl.
| | |
|---|---|
| *H04W 4/48* | (2018.01) |
| *H04W 76/27* | (2018.01) |
| *G07C 5/00* | (2006.01) |
| *H04W 36/00* | (2009.01) |
| *H04W 48/18* | (2009.01) |
| *H04W 64/00* | (2009.01) |
| *H04W 84/04* | (2009.01) |

(52) U.S. Cl.
CPC ....... *H04W 36/0022* (2013.01); *H04W 48/18* (2013.01); *H04W 64/006* (2013.01); *H04W 76/27* (2018.02); *H04W 84/042* (2013.01)

(56) References Cited

U.S. PATENT DOCUMENTS

| | | | |
|---|---|---|---|
| 10,868,733 | B2 | 12/2020 | Dribinski et al. |
| 2009/0170434 | A1 | 7/2009 | Tengler et al. |
| 2012/0158820 | A1 | 6/2012 | Bai et al. |
| 2012/0163275 | A1 | 6/2012 | Kim et al. |
| 2012/0275445 | A1* | 11/2012 | Karlsson .............. H04B 1/3822 370/338 |
| 2013/0157711 | A1* | 6/2013 | Lee ....................... H04W 48/18 455/525 |
| 2014/0128072 | A1 | 5/2014 | Yi et al. |
| 2014/0286213 | A1* | 9/2014 | Morrison .......... H04W 52/0261 370/311 |
| 2015/0319511 | A1* | 11/2015 | Droste .................. G07C 5/008 340/870.07 |
| 2016/0197782 | A1 | 7/2016 | Hort et al. |
| 2016/0242223 | A1* | 8/2016 | Brahmi .................. H04W 4/46 |
| 2016/0302171 | A1 | 10/2016 | Krauss et al. |
| 2017/0055201 | A1 | 2/2017 | Murray et al. |

OTHER PUBLICATIONS

Siemens et al.: "GSM/UMTS to IMS Handover Scenario", 3GPP Draft; S2-051265 Voice Call Continuity—4 GSM to IMS Handover—Siemens, 3rd Generation Partnership Project (3GPP), Mobile Competence Centre, SAWG2: Athens, May 4, 2005.

Zhang Jizheng et al: "M2M Facilitated Wireless Network Coverage Management and Real-Time Monitoring", 2014 IEEE Network Operations and Management Symposium (NOMS), IEEE, May 5, 2014, pp. 1-5.

International Search Report and Written Opinion, International Application No. PCT/IL2018/050535, dated Aug. 20, 2018.

International Preliminary Report on Patentability, International Application No. PCT/IL2018/050535, dated Aug. 8, 2019.

European Search Report—EP20203075—Search Authority—Hague—dated Jan. 28, 2021.

* cited by examiner

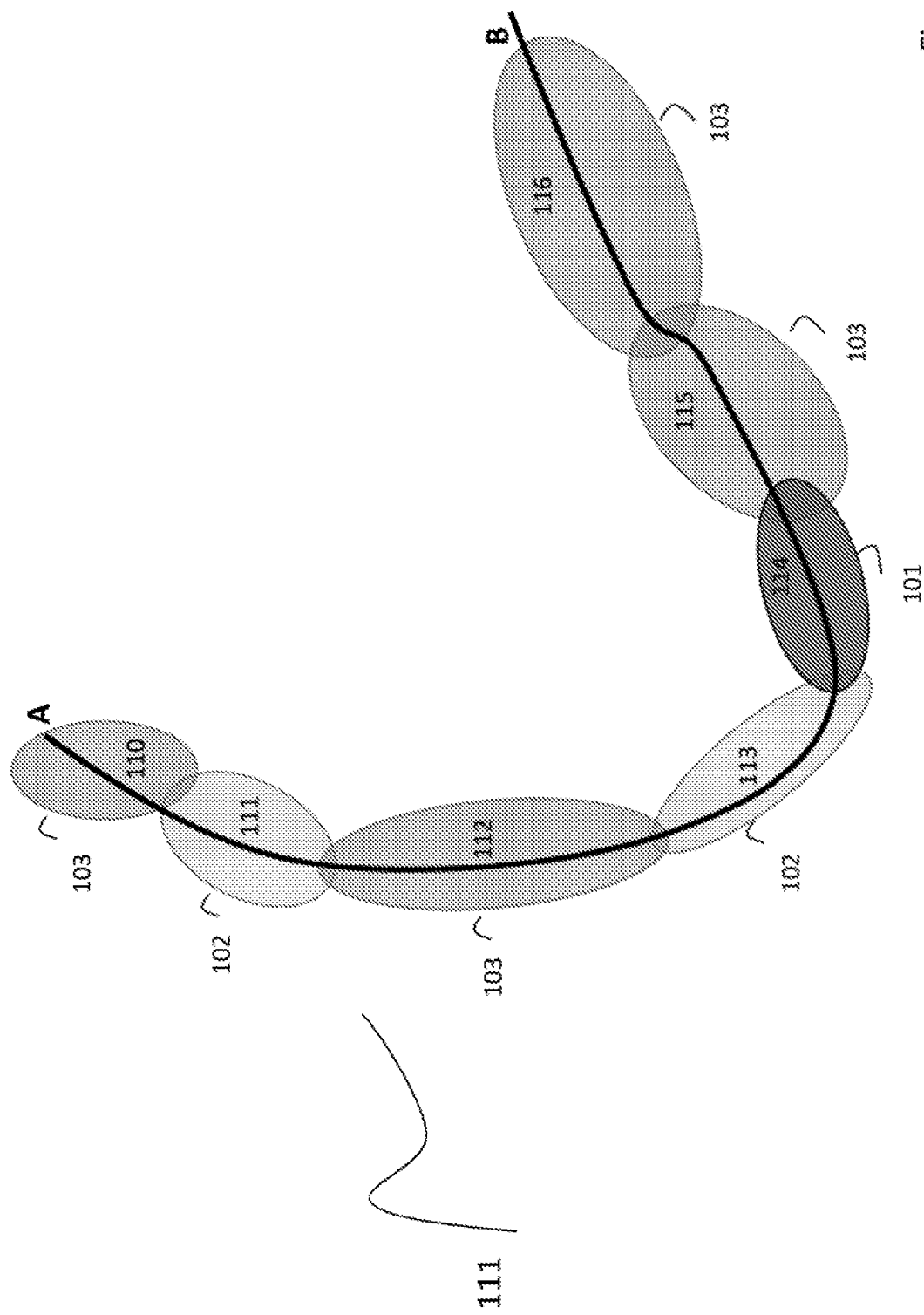

METHOD AND SYSTEM OF MANAGING RADIO CONNECTIVITY OF A VEHICLE

CROSS-REFERENCE TO RELATED APPLICATIONS

The present application is a divisional application of U.S. patent application Ser. No. 16/670,868, filed on Oct. 31, 2019, now U.S. patent Ser. No. 10/868,733, which itself is a continuation application that claims the benefit of priority to International Patent Application No. PCT/IL2018/050535, filed on May 16, 2018, which itself claims the benefit of priority to U.S. Provisional Patent Application No. 62/507,258, filed on May 17, 2017. These applications are herein incorporated by reference in their entirety.

TECHNICAL FIELD

The presently disclosed subject matter relates generally to systems and methods of managing radio connectivity in a cellular network and, in particular, to systems and methods of managing radio connectivity for vehicles.

BACKGROUND

Embedded connectivity provided by "Connected car" technologies fundamentally changes the way consumers use their cars. Connectivity of a "connected car" is provided by a vehicle telematic system enabling a vast variety of communication-related services available via a communications network. Among communication-related services are advanced roadside assistance, infotainment, telematics, remote diagnostics, fleet management and others, whilst different services require different quality of service (QoS).

Problems of providing communication-related services for vehicles have been recognized in the conventional art and various techniques have been developed to provide solutions, for example:

US Patent Application No. 2014/0128072 discloses a method of re-attempting to wirelessly connect a vehicle telematics unit with a wireless carrier system. The method includes detecting that a primary retry method has failed, and carrying out a secondary retry method that determines whether the vehicle telematics unit will communicate using a first radio access technology (RAT) or a second RAT; the method re-attempts a cellular connection with one or more base stations using a first RAT attachment procedure when it is determined that the vehicle telematics unit will communicate using the first RAT, and re-attempts a cellular connection with one or more base stations using a second RAT attachment procedure when it is determined that the vehicle telematics unit will communicate using the second RAT.

US Patent Application No. 2016/00302171 discloses a method for roaming management in a mobile radio unit, in the memory of which a plurality of different individually activatable identity profiles are stored. The identity profiles include different options for the mobile radio unit to access different mobile radio networks. In the method, the suitability of a currently active identity profile is automatically verified according to predefined rules and takes into account the current position of the mobile radio unit, and a decision is made as to whether a switch to a currently inactive identity profile should be made. An estimated destination of the mobile radio unit is additionally taken into account when making a decision about switching profiles.

US Patent Application No. 2016/0197782 discloses a removable device, adapted to connect a mobile communication device to a head unit of a vehicle and comprising a first communication module having a first transceiver and configured for bi-directional communication of data with the head unit; a second communication module having a second transceiver and configured for bi-directional communication of data with the mobile communication device; and a control unit configured to provide at least one service to the head unit via the first communication module based on data received via the second communication module.

US Patent Application No. 2017/0055201 discloses a vehicle carrier swap system including a controller that, in response to a notification indicating first public land mobile network (PLMN) access signal quality is less than a threshold, and successful registration with a second PLMN selected from a set of PLMNs made available by at least two subscriber identity modules associated with non-roaming partner carriers according to a priority defined by the carriers, provides network access using the second PLMN.

U.S. Pat. No. 9,578,580 discloses a system and method of controlling a wireless device communicating with a cellular communications system. The method includes establishing a cellular connection between the wireless device and a first cell tower; detecting, at the wireless device, a reference signal received power (RSRP) measurement of a signal broadcast by the first cell tower; increasing an RSRP threshold used by the wireless device by adding an offset value to the RSRP threshold; determining whether the detected RSRP measurement of the signal broadcast by the first cell tower falls below the increased RSRP threshold; and initiating a cellular connection with a second cell tower.

The references cited above teach background information that may be applicable to the presently disclosed subject matter. Therefore the full contents of these publications are incorporated by reference herein where appropriate for appropriate teachings of additional or alternative details, features and/or technical background.

SUMMARY

In accordance with certain aspects of the presently disclosed subject matter, there is provided a method of managing radio connectivity of a vehicle comprising a telematic system. The method comprises: continuously receiving by the telematic system a predictive model generated by a remote system using data continuously collected from a plurality of vehicles, wherein the collected data comprise, for each given vehicle of the plurality of vehicles, data informative of its location, speed and of Radio Access Technology (RAT)-related measurements provided by telematic system of the given vehicle; and, responsive to a predefined event, applying, by the telematic system, a lastly received predictive model to current values of a predefined set of inputs associated with the vehicle to obtain instructions and respectively provide one or more corrective actions related to radio connectivity of the vehicle.

The predefined set of inputs can comprise location of the vehicle, its speed, a currently activated leading communication-related service, and RAT-related measurements provided by the vehicle. The predefined set of inputs can further comprise data informative of Service Level Agreement (SLA) violation or near SLA violation for the leading service.

By way of non-limiting example, the predefined event can be selected from the group consisting of changes of RAT and/or band characterizing radio connectivity of the vehicle, activation/deactivation of a communication-related service provided to the vehicle, change of a location bin, SLA violation and near SLA violation.

By way of non-limiting example, the one or more corrective actions can be selected from the group consisting of:

a. modifying one or more Radio Resource Control (RRC) measurement reports so as to force intra-RAT handover or inter-RAT handover;

b. modifying one or more RRC measurement reports so as to exclude available connectivity with undesired RAT or band;

c. modifying one or more RRC measurement reports so as to force the cellular network to terminate the radio connectivity and to enable automatic RAT re-selecting;

d. terminating the radio connectivity by the telematic system thus enabling further RAT re-selecting; and e. enabling selecting a network predefined as "preferred" for an activated service.

In accordance with other aspects of the presently disclosed subject matter, and, optionally, in combination with the above aspects, there is provided a method of operating a vehicle telematic system operatively connected to a cellular network characterized by one or more Radio Access Technologies (RAT). The method comprises: continuously obtaining by the telematic system data indicative of current values of a predefined set of inputs associated with the vehicle, the predefined set of inputs comprising location of the vehicle, its speed, a currently activated leading communication-related service and RAT-related measurements provided by the vehicle; and, responsive to a predefined event, modifying by the telematic system one or more RRC measurement reports and sending the modified one or more RRC measurement reports to the cellular network. The RRC measurement reports are modified to enable one or more actions selected from the group consisting of: forcing the cellular network to provide intra-RAT handover or inter-RAT handover; excluding available connectivity with undesired RAT or band; and forcing the cellular network to terminate radio connectivity with the telematic system and to enable automatic RAT re-selecting.

The RRC measurement report can be modified using a predictive model generated by a remote system using data continuously collected from a plurality of vehicles, wherein the collected data comprise, for each given vehicle of the plurality of vehicles, data informative of location, speed and of RAT-related measurements provided by respective telematic system.

In accordance with other aspects of the presently disclosed subject matter, there is provided a vehicle's telematic system configured to operate in accordance with the methods above.

In accordance with other aspects of the presently disclosed subject matter, there is provided a remote system configured to generate the predictive model usable in accordance with the methods above.

In accordance with other aspects of the presently disclosed subject matter, there is provided a computer program product implemented on a non-transitory computer usable medium and comprising computer readable program code for performing in accordance with the methods above.

Among advantages of certain embodiments of the presently disclosed subject matter is capability of exploiting existing cellular standards for managing connectivity of a vehicle, in consideration of its speed, location and desired QoS.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 1a and 1b schematically illustrate an exemplified fragment of a cellular network along an exemplified roadway;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "deciding", "comparing", "generating", "selecting", "matching", "calculating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the traffic management system, telematic system and processing circuitry therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Figure 1A:
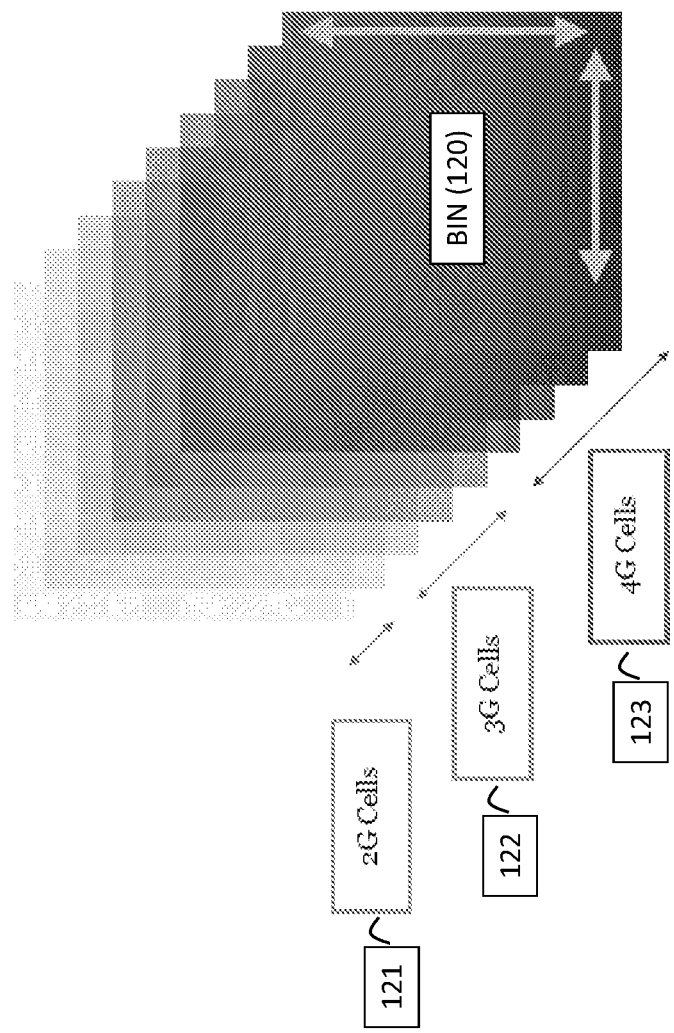

Bearing this in mind, attention is drawn to FIGS. 1a and 1b schematically illustrating an exemplified fragment of a cellular network along an exemplified roadway.

As known in the art, a cellular communication network comprises a radio access network (RAN) with base stations disposed to provide radio coverage in a certain geographical area. The area can be covered by a plurality of cells with, at least, partly overlapped footprints. At least some of the cells can differ in their radio access technologies (RATs) and/or frequency bands. Further, within the same RAT, there can be different types of base stations. By way of non-limiting example, the base stations can comprise macro cells arranged to provide radio coverage over a relatively large area and small area cell base stations (e.g. micro cells, pico cells and/or femto cells) typically having significantly smaller coverage area, whilst serving "hot spots" and enhancing the "edges" and "shadows" coverage.

Exemplified area portion 120 (referred to hereinafter also as location bin) illustrated in FIG. 1a is covered (at least partly) by one or more 2G cells 121, one or more 3G cells 122 and one or more 4G cells 123. Optionally, in future it can be covered also by 5G cells (not shown). RAN's capability to provide connectivity to a user varies at different locations and/or times. Furthermore, the quality of the provided connectivity can significantly vary over the network. Different communication-related services may have different requirements for QoS parameters. By way of non-limiting example, the quality of infotainment services substantially depends on the available throughput. Packet loss can be very important for hazard alerts, while latency can be essential for the quality of fleet management. Accordingly, different services can be best served by different cells (in the same or different RATs and/or frequency bands).

The illustrated in FIG. 1b exemplified fragment of a cellular network 100 comprises areas denoted as 101 that are covered by 2G RAT only, areas denoted as 102 that are covered by 3G RAT and 2G RAT, and areas denoted as 103 that are covered by 4G RAT, 3G RAT and 2G RAT. Typical network planning defines higher priorities for later protocols and higher frequency bands. When a vehicle drives from A to B whilst consuming one or more communication-related data services, it will be served by 4G RAT on road segment 110 and by 3G RAT on road segment 111. Depending on RAN planning, on road segment 112 the service can be switched to 4G RAT even if 4G RAT quality (e.g. latency) is of poorer quality than a quality that could be provided by 3G RAT which is also available on this segment. On road segment 114 the connection will be switched to 2G RAT (GPRS/EDGE). In a case of a typical RAN planning that forbids 2G-→4G mobility during service operation, the connection will continue to be "camped" to 2G even when the vehicle moves to segments 115 and 116 with 4G support. By way of a further (non-illustrated) non-limiting example, prioritization of high frequency bands can increase the number of handovers experienced by a fast-moving vehicle. Furthermore, within the same RAT, handover to a better quality (for consuming service(s)) cell can occur significantly later than connectivity to such a better cell becomes obtainable.

Thus, in practice, a vehicle can receive a poor quality connection (i.e. quality that does not fit the requirements of consuming service(s)), even when a good quality connection may be obtainable. Furthermore, in view of the continuous nature of "connected car" services (e.g. navigation, infotainment, telematics, etc.), a telematic system has significantly less idle time than a regular handset. Accordingly, a telematic system has less opportunities of idle mode re-selecting a best-fitting RAT. Therefore, as found by the inventors, there is a need for a technique that can enable a vehicle to select, among cells covering a certain location bin, a cell most fitting QoS requirements of currently consuming service(s), such selection not necessarily withstanding the predefined configuration of the cellular network 100.

Figure 2:
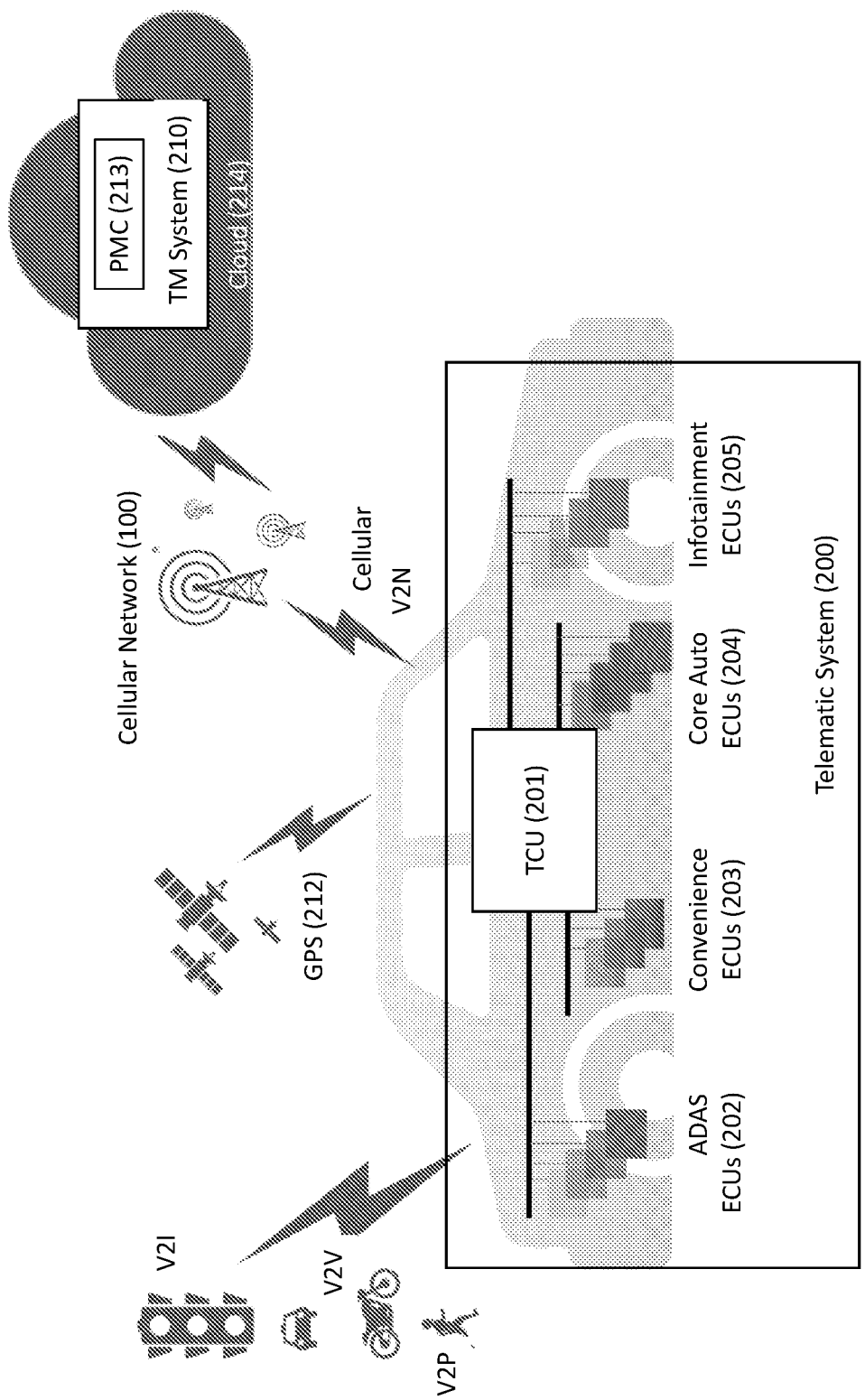
FIG. 2 illustrates a generalized block diagram of a telematic system configured in accordance with certain embodiments of the presently disclosed subject matter.

Referring to FIG. 2, there is illustrated a generalized block diagram of a telematic system configured in accordance with certain embodiments of the presently disclosed subject matter. Telematic system 200 is configured to be deployed in a vehicle and to enable communication-related services to be provided to a user (e.g. driver, passenger, car, OEM, fleet, etc.). Telematic system 200 includes a plurality of electronic control units (ECUs). ECUs can be configured to receive inputs from one or more sensors and use the sensed input to perform diagnostic, monitoring, control, reporting and/or other functions. By way of non-limiting example, telematic system 200 can include advanced driver assistance system (ADAS) ECUs 202, convenience ECUs 203, core-auto ECUs 204, infotainment ECUs 205, etc. ECUs are operatively connected to Telematic Control Unit (TCU) 201 configured to enable communication-related services for the vehicle. ECUs can exchange data and commands therebetween directly and/or via TCU 201. TCU is configured to enable data fusion from multiple internal and/or external sources and data exchange therebetween. TCU is further configured to enable communication between telematic system 200 and cellular network 100, Global Positioning System (GPS) 212, external systems via V2X, C-V2x and other suitable protocols, etc.

As will be further detailed with reference to FIG. 3-4, TCU is further configured to enable communication with a traffic management system 210 (referred to hereinafter as a TM system or TMS) located in a cloud 213 connectable via cellular network 100. The TMS further comprises a processor and memory circuitry (PMC) 213.

Figure 3:
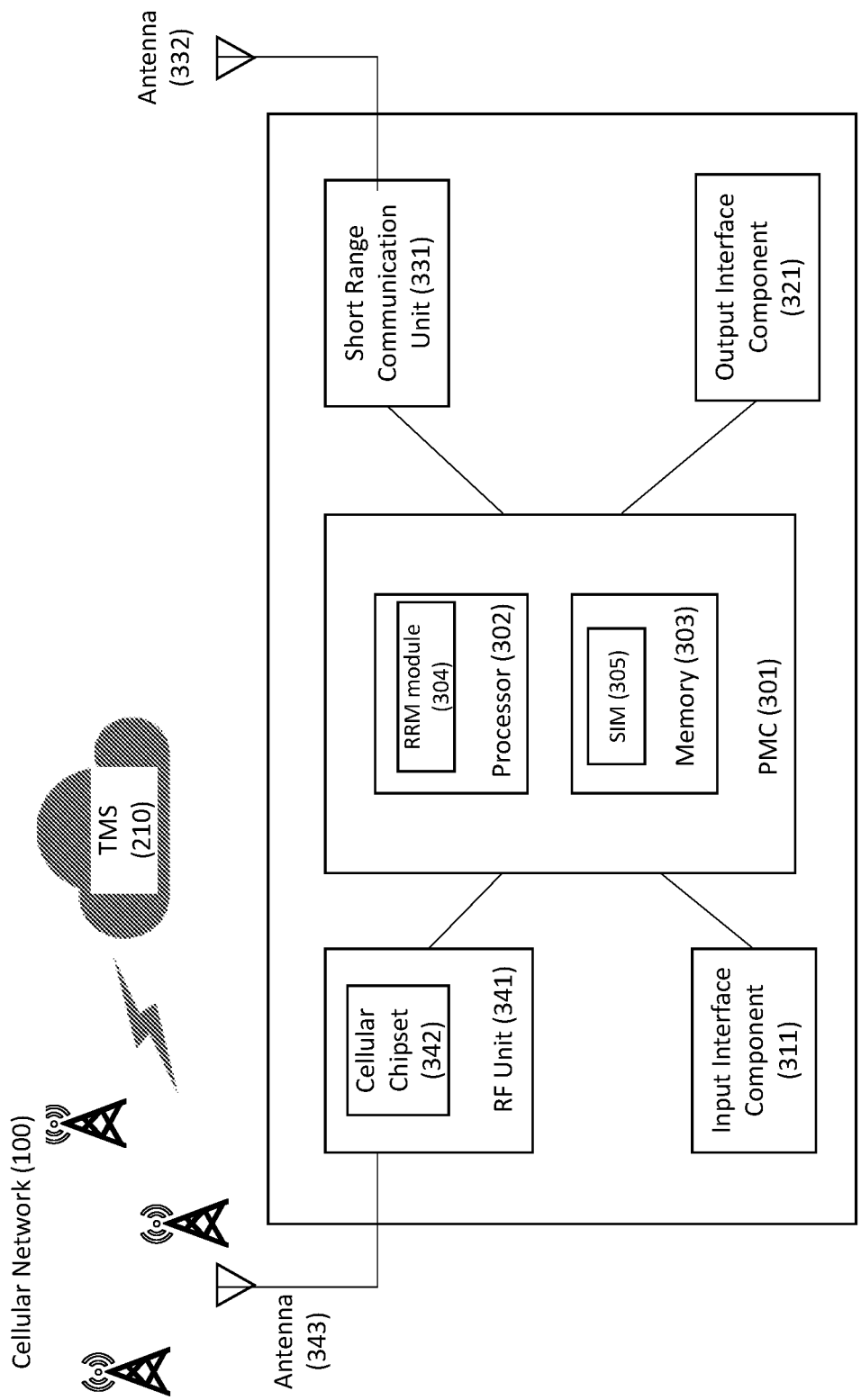
FIG. 3 illustrates a generalized block diagram of telematic control unit (TCU) configured in accordance with certain embodiments of the presently disclosed subject matter.

Referring to FIG. 3, there is illustrated a generalized block diagram of TCU 201 configured in accordance with certain embodiments of the presently disclosed subject matter. TCU 201 comprises a processor and memory circuitry (PMC) 301 operatively connected to an input interface component 311, an output interface component 321, a short distance communication unit 331 and RF unit 341.

Input interface component 311 is configured to receive data indicative of vehicle position (e.g. from a GPS), data from external road systems and sensors (e.g. data informative of road conditions, parking, lights, etc. receivable via V2X protocol, C-V2X and/or other suitable protocols), data from ECUs operatively connected to TCU 201, etc. Data from external systems can be received, for example, via unit 331 or unit 341). Optionally, input interface component 311 can comprise a user interface configured to receive data inputs from a user.

Output interface component 321 is configured to send data and/or commands to ECUs operatively connected to TCU 201. Optionally, output interface component 321 can comprise a user interface configured to render data outputs to a user.

Short distance communication unit 331 is configured to enable short range wireless communication (SRWC) (e.g. via IEEE 802.11 protocols, WiMAX, Bluetooth, near field communication (NFC), V2I, V2P, V2V or other suitable protocol). Short distance communication can be provided via antenna 332.

RF unit 341 is configured to enable wireless voice and/or data communication over cellular network 100, thus enabling communication-related services. RF unit comprises a cellular chipset 342 configured to operate in multiple Radio Access Technologies (RATs) and to communicate with cellular network 100 using appropriate standards (e.g. LTE and earlier protocols such as GSM, GPRS, CDMA, UMTS, etc.). As will be further detailed with reference to FIGS. 4-9, cellular chipset 342 is further configured to provide RAT-related measurements and to report the results (and/or derivatives thereof) to respective entities in cellular network 100. In accordance with certain embodiments of the presently disclosed subject matter, cellular chipset 342 is further configured to enable reporting data informative of the measured results to TMS 210. Such reporting can be provided via cellular network 100, optionally using V2N protocol. RF unit 341 further comprises one or more antennas 343 configured to enable such communication in appropriate frequency bands.

PMC 301 comprises a processor 302 operatively connected to a memory 303. Processor 301 and/or memory 303 can be a dedicated processor and/or memory used only by TCU 301 or can be shared with other vehicle components. PMC 301 is configured to provide processing necessary for operating TCU 301 as further detailed with reference to FIGS. 4-9. Data received from the ECUs and/or external systems can be stored in the memory 303. PMC is configured to send, when necessary, at least part of the stored data (or derivatives thereof) to one or more external systems via RF unit 341. PMC 301 can exchange data and commands with chipset 342 via a chipset API (not shown).

Processor 302 is configured to execute several functional modules in accordance with computer-readable instructions implemented on a non-transitory computer-readable memory comprised in PMC 301. Such functional modules are referred to hereinafter as comprised in PMC 301. Functional modules comprised in PMC 301 include Radio Resource Management (RRM) module 304 further detailed with reference to FIGS. 4-9. Memory 303 can comprise one or more Subscriber Identity Modules (SIMs) 305.

Those versed in the art will readily appreciate that the teachings of the presently disclosed subject matter are not bound by the system illustrated in FIGS. 2 and 3; equivalent and/or modified functionality can be consolidated or divided in another manner and can be implemented in any appropriate combination of software with firmware and/or hardware. It is noted that, optionally, RRM module can be a separate module or can be integrated with one or more ECUs, and can exchange data and commands with TCU via the input and output interface components. It is further noted that, optionally, TCU can be implemented as several TCU modules, each operatively connected to a respective group of ECUs. Communication between TCU and TMS can be provided with the help of an API (Application Program Interface). The API (not shown) can be comprised in RF unit 341 and/or in input and/or output interface components.

Figure 4:
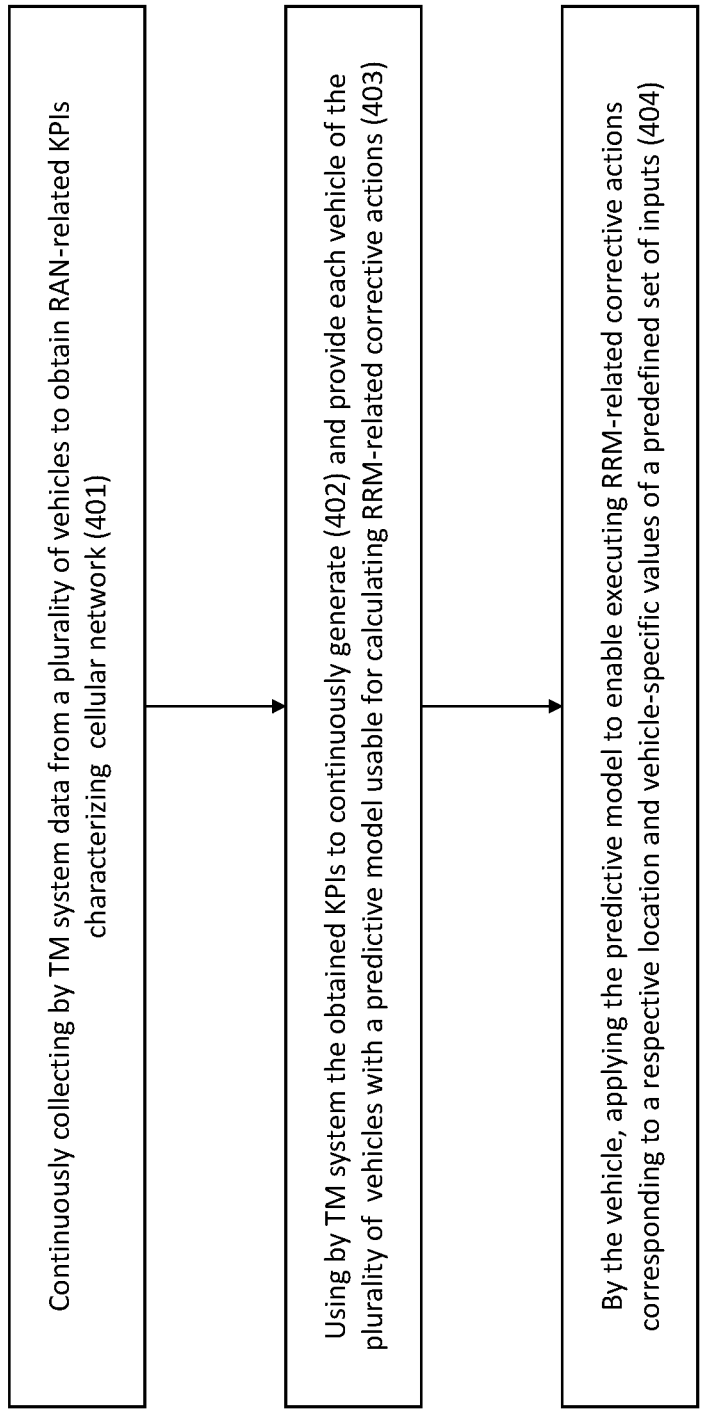
FIG. 4 illustrates a generalized flow chart of managing radio connectivity of a vehicle in accordance with certain embodiments of the presently disclosed subject matter.

Referring to FIG. 4, there is illustrated a generalized flow chart of managing radio connectivity of a vehicle. In accordance with certain embodiments of the presently disclosed subject matter, TM system 210 is configured to operatively communicate with a plurality of vehicles. In each given vehicle, its telematic system 200 is configured to continuously report to TMS 210 data informative, at least, of vehicle location, speed and of provided RAT-related measurements, the measurement data being reported in association with respective cells. TMS 210 is configured to continuously collect (401) such data from the plurality of vehicles to obtain RAN-related KPIs.

RAT-related measurements can be provided by telematic system 200 (e.g. by chipset 342 in an operative or idle mode) and can be related to a serving cell and to one or more surrounding cells (not necessary included in a neighbouring list of the serving cell) in the same or in different RAT(s). RAT-related measurements include constantly provided measurements of a radio resource (RR) channel. Further, when operating in 3G or later RATs, RAT-related measurements include RRC measurements provided for RRC (Radio Resource Control) measurement reports (referred to hereinafter also as RRC reports). By way of non-limiting example, data informative of RAT-related measurements can include Reference Signal Received Power (RSRP), Reference Signal Received Quality (RSRQ), Received Signal Strength Indication (RSSI), Signal-Noise Ratio (SNR), Channel Quality Indicator (CQI), data throughput, latency, packet loss, etc. The telematic system can store the results of RR channel measurements and further report them to TMS, responsive to predefined events (e.g. change of geo-location (e.g. every 10 m), change of RAT, activation of new service, etc.). Such predefined events can be specified by TMS and stored, for example, in PMC 301. Data informative of RRC measurements can be reported to TMS in accordance with a period for providing RRC report and events triggering RRC reporting, the period and the triggering events being specified by the cellular network. It is noted that RR-channel measurements can include measurements which are not required for RRC reporting. It is further noted that, optionally (e.g. in a cellular network with no 2G RAT), data informative of RAT-related measurements can merely include data informative of RRC measurements.

Optionally, further to data informative of location and of RAT-related measurements, the telematic system can report to TMS data informative of antenna type, service type (e.g. in call, data, idle), etc. Respectively calculated KPIs can characterize accessibility, retainability, integrity, mobility, availability and/or other quality characteristics as defined by respective cellular standards. A given KPI can be related to all communication services provided at a given location by a given cell or can be related to one or more selected communication-related services and/or one or more ECUs.

Optionally, telematic system (e.g. RRM module therein) can be further configured to process at least part of data informative of RAT-related measurements to reveal a violation and/or near violation of a SLA (Service Level Agreement) stored in the telematic system. By way of non-limiting example, SLA can specify, for each given service or group thereof, a threshold number of drops and/or silent calls, a threshold latency, a threshold throughput, etc.

Unless specifically stated otherwise, it is appreciated that throughout the specification the terms "continuously collecting data by TMS" or the like refer to receiving (in push or pull mode) data substantially each time new data is available to the TMS. For example, in "push" mode, the availability of new data from a given telematic system can be defined by a period specified as collection time and/or reporting time for the given telematic system, by availability of connection from the given telematic system to TM system, by predefined "push" events (e.g. events specified in the cellular network for providing RRC report, events of SLA violations, etc.), etc. In "pull" mode, the availability of new data can be defined by configuration of the TMS system specifying when to pull the data. Likewise, the terms "continuously obtaining", "continuously reporting", "continuously generating", "continuously providing" and the like, refer to actions (of TMS or the telematic system) provided in accordance with a certain arrangement related to new data availability. For example, such actions can be provided in near real-time mode, responsive to predefined events, etc. It is noted that, unless specifically stated otherwise, the term "predefined events" should be expansively construed to cover also scheduled events and events occurring in accordance with predefined periodicity.

TM system 110 uses the obtained RAN-related KPIs to continuously generate (402) a predictive model usable for enabling selection of desirable cells corresponding to location, speed, activated service(s) and RAT-related measurements of respective vehicles. Optionally, the predictive model can be generated using, also, statistical data informative of KPIs dependency on day/week time. When so, selection of a desirable cell can be also dependent on the time of selection. Optionally, when generating the predictive model, TMS can, in addition, use data informative of RAN-related KPIs received from one or more entities in the cellular network and/or from one or more $3^{rd}$ parties.

TM system further continuously provides (403) the vehicles of the plurality of vehicles with the most updated predictive model. By way of non-limiting example, TM system can generate and/or send the updated model in accordance with a pre-defined schedule (e.g. every 24 hours) and/or responsive to events when certain changes in the collected data exceed a predefined threshold.

The telematic system of a given vehicle applies the provided predictive model to enable (404) changes of radio connectivity of the vehicle required for the telematic system in order to be served by a desirable cell corresponding to the current values of the vehicle's predefined set of inputs. Actions of the telematic systems causing such changes (in the cellular network and/or in the telematic system itself) are referred to hereinafter as corrective actions or RRM-corrective action(s).

By way of non-limiting example, the predefined set of inputs can include location of the vehicle, its speed, one or more communication-related services activated in the vehicle, RAT-related measurements provided by the vehicle, etc. Optionally, the set can further include data informative of SLA violation or near SLA violation for currently activated services. Operation 404 can be provided by telematic system responsive to predefined events (e.g. changes of RAT and/or band; activation/deactivation of a service; changes of location bin (e.g. defined as 1000×1000 metres) and/or periodically (e.g. every minute), etc.). It is noted that output of operation (404) can be, also, that no RRM-corrective actions are required or no RRM-corrective actions are possible.

It is noted that, in certain embodiments, the plurality of vehicles can include, further to the vehicles being in bidirectional data exchange with TMS, vehicles which do not report RAT-related measurements to the TMS, but receive the generated model, and/or vehicles which report RAT-related measurements, but do not receive the model generated by TMS.

As will be further detailed with reference to FIGS. 5-9, RRM-corrective actions can include:
a) modifying RRC measurement report so as to force intra-RAT handover or inter-RAT handover (e.g. 4G-→3G handover on road segment 111 illustrated in FIG. 1b) to the desirable cell;
b) modifying RRC measurement report so as to exclude available connectivity with undesired RAT or band (e.g. in order to reduce the number of handovers for active service in a fast-moving vehicle at 2600 MHz/800 MHz 4G segments, turn 2600 MHz connectivity to unavailable);
c) modifying RRC measurement report so as to force the cellular network to terminate the connection in order to terminate undesirable camping and to enable automatic re-selecting the desirable RAT (e.g. 2G-→4G re-selection on road segments 115 and 116 illustrated in FIG. 1b);
d) terminating the respective connection by telematic system thus enabling further RAT re-selection in idle mode; and
e) using the chipset API to enable selecting a network predefined as "preferred" for a given service.

For purpose of illustration only, the following description is provided, unless specifically stated otherwise, for RRM-corrective actions a)-c) based on modification of RRC reports. Those skilled in the art will readily appreciate that the teachings of the presently disclosed subject matter are, likewise, applicable to modifications of RR-channel measurements provided for 2G RAT. In such cases, telematic system can be configured to modify, for example, the reported BCCH Allocation List (BA-list).

It is noted that in a case of several concurrently activated services, RRM-corrective actions can be provided in accordance with a service having the highest priority among the activated services. Telematic system can be configured to store predefined (and/or configured by a user) priorities of the communication-related services in PMC 301. A single currently activated communication-related service or a communication-related service with the highest priority among a plurality of the currently activated communication-related services is referred to hereinafter as a leading service. Optionally, two or more communication-related services can be configured with the same priority. In such a case, a group of communication-related services with the same highest priority among the plurality of the currently activated services can be referred to as a leading service, and RRM-corrective actions can be applicable only without deterioration of any service in the group defined as the leading service.

It is further noted that while applying the predictive model enables selection of a desirable cell, the predictive model and/or telematic system are not necessarily aware which of the cells is namely the desirable cell. By applying the predictive model, telematic system is capable of providing RRM-corrective actions enabling connection to a cell that could best match the activated service(s) in accordance with a vehicle's speed and location, as well as with results of RAT-related measurements, such cell being referred to hereinafter as a desirable cell. The matching conditions for a given service can be specified by SLA and/or configured by a user/TSM (e.g. the best achievable latency, the best achievable throughput, 4G and later RAT, etc.). Thus, unless specifically stated otherwise, the used herein terms "define a desirable cell", "select a desirable cell" and the like should be expansively construed to cover also implicit definition and/or selection of the desirable cell by specifying RRM-corrective actions required for being serviced by the desirable cell.

It is further noted that while applying the predictive model enables decision on the type of RRM-corrective action and further forcing a desired RRM-corrective action, the predictive model and/or telematic system are not necessarily aware what, namely, is the desired corrective action. Thus, unless specifically stated otherwise, the used herein terms "taking decision about desired corrective action", "forcing the desired corrective action" and the like should be expansively construed to cover also implicit decision and/or forcing the desired RRM-corrective action by modifying the RRC report or by providing respective TCU-based actions in accordance with the applied predictive model and values of the predefined set of input.

In accordance with certain embodiments of the currently presented subject matter, the predictive model can be configured to define, when applied, RRM-corrective actions in accordance with the preferences predefined for each given leading service. Optionally, the preferences can be predefined in accordance with expected improvement of quality of a given leading service, likelihood of success of a given RRM-action, expected negative impact, etc. Non-limiting examples of predefined RRM-corrective actions are further detailed with reference to FIG. 6.

Generating the predictive model can include generating a weighting matrix configured to transform, in accordance with the values of the predefined set of inputs, the RAT-related measured values into RAT-related modified values to be reported to the cellular network. As will be further illustrated with reference to FIGS. 7-8, the modified values in the RRC report can enable selecting the desirable cells.

The weighting matrix can be generated by any appropriate machine learning technique applied to the collected data. By way of non-limiting example, generation can include normalizing the collected data per antenna gain, clustering the normalized data, providing QoS-related classification of the cells for each service and/or service group, generating an initial weighting matrix and training the weighting matrix so as to calculate modifications of the RRC report required for the desirable connectivity in consideration of current location, speed, activated service(s) and RAT-related measurements.

In accordance with certain embodiments of the currently presented subject matter, there can be two types of RRM-corrective actions: network-based RRM-corrective actions enabling desirable changes in the cellular network in response to the RRC report modified by the telematic system, and TCU-based RRM-corrective actions causing desirable tasks in the TCU.

The generated predictive model can further comprise a predictive decision function configured to provide to the telematic system (e.g. to RRM module) instructions of which type of RRM-corrective actions, network-based or TCU-based, corresponds to the current values of a second predefined set of inputs. The second predefined set of inputs can be the same as the predefined set of inputs, or can be a subset thereof. By way of non-limiting example, the second predefined set of inputs can include location, speed, activated service(s), but do not necessarily include data informative of RAT-related measurements.

When the RRM-corrective actions are TCU-based, the predictive decision function can be further configured to provide to the telematic system instructions of what, namely, TCU-based corrective action shall be applied. When the RRM-corrective actions shall be network-based (i.e. provided with the help of modifying RRC report), the instructions can comprise calculating the required modification with the help of weighting matrix. Optionally, the predictive model can comprise the predictive decision function integrated with the weighting matrix.

Figure 5:
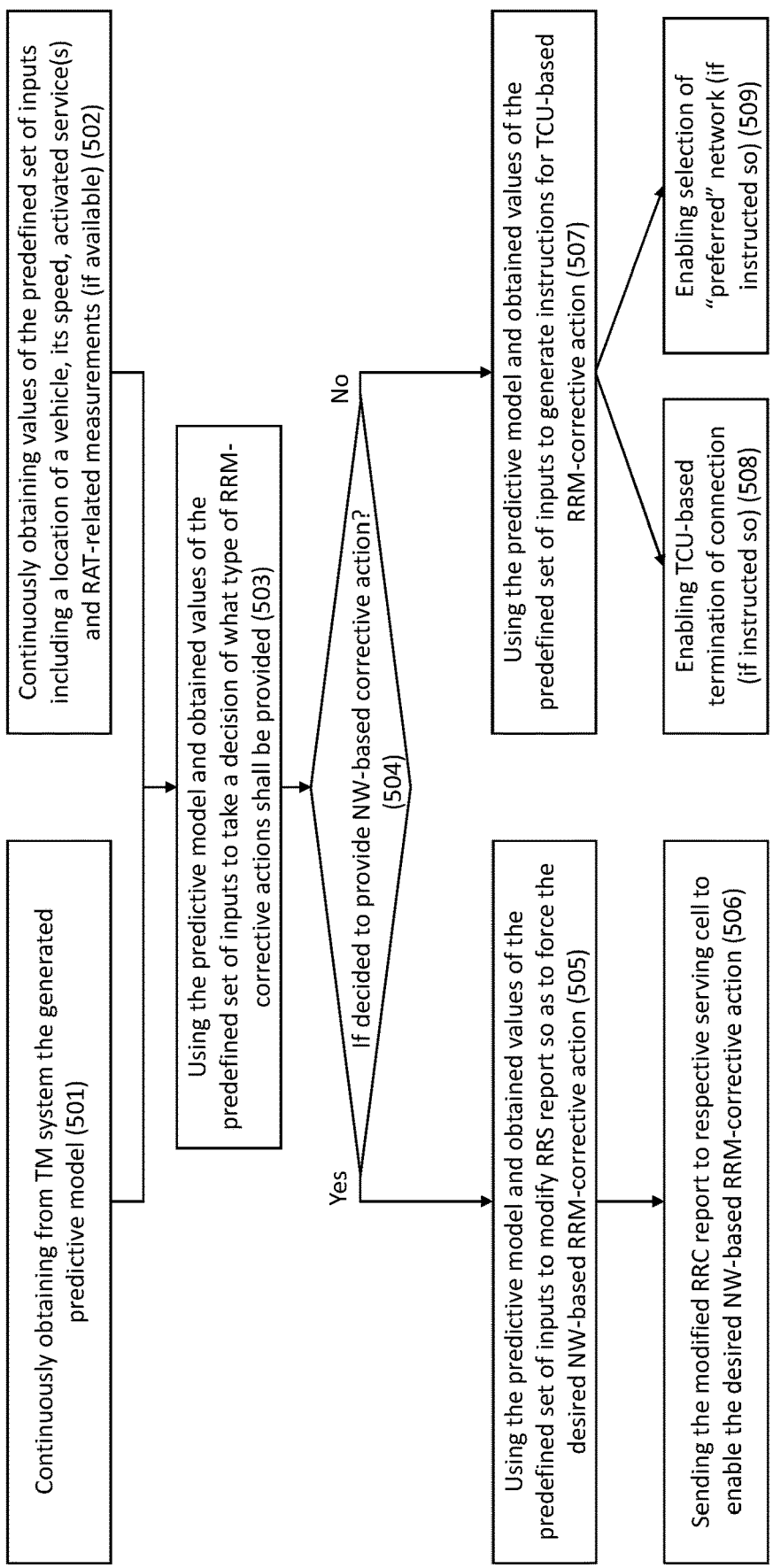
FIG. 5 illustrates a generalized flow chart of operating the telematic system in accordance with certain embodiments of the presently disclosed subject matter.

Referring to FIG. 5, there is illustrated a generalized flow chart of operating the telematic system in accordance with certain embodiments of the presently disclosed subject matter. Telematic system 200 (e.g. PMC 302) continuously (e.g. every 24 hours, every 12 hours, etc.) obtains (501) from TMS the generated predictive model. Independently, telematic system 200 (e.g. PMC 302) continuously obtains (502) values of the predefined set of inputs (e.g. location of a vehicle, its speed, activated service(s) and data informative of RAT-related measurements when available)). The obtained predictive model and the values of predefined set of inputs can be stored in memory 303.

Responsive to predefined events, telematic system 200 (e.g. PMC 301) applies the predictive model to the obtained values of the predefined set of inputs to make a decision (503) about which type of RRM-corrective actions shall be provided.

As detailed above, there can be two types of RRM-corrective actions: network-based RRM-corrective actions enabling desirable changes in the cellular network in response to the RRC report modified by the telematic system, and TCU-based RRM-corrective actions causing desirable tasks in the TCU.

Figure 6:
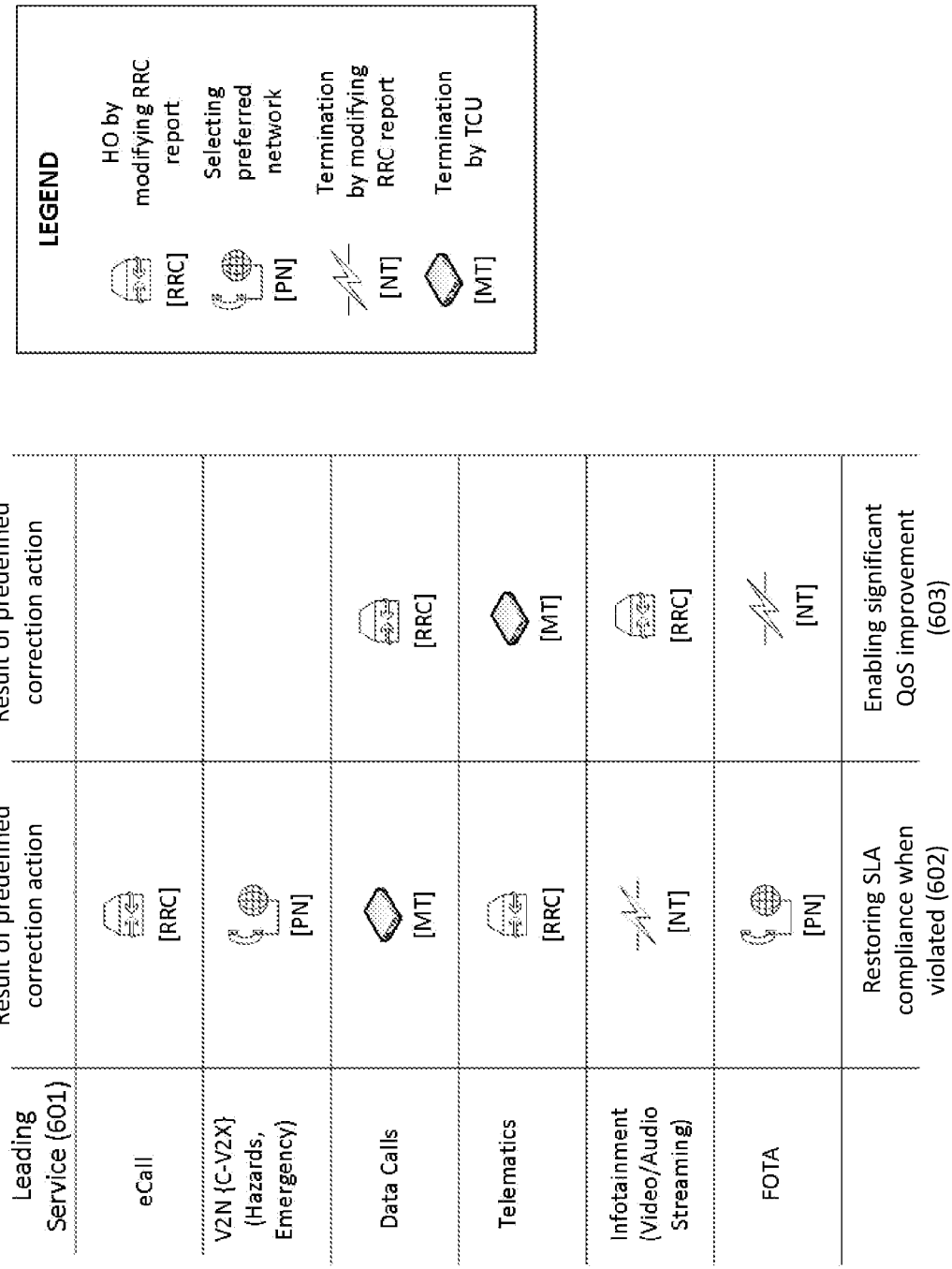
FIG. 6 illustrates non-limiting examples of predefined RRM-corrective actions in accordance with certain embodiments of the currently presented subject matter.

Optionally, RRM-corrective actions for different leading services can be predefined, depending on service quality requirements, expected impact of the action (positive and negative) and likelihood of success. Non-limiting examples of predefined RRM-corrective actions are illustrated in FIG. 6 with regard to different predefined services (601). For example, the results of RRM-corrective actions can be characterized by their impact on service continuity. Among the illustrated results, RRC-forced handover has minimal impact on service continuity, while TCU-based termination with further cell re-selection has maximal impact on service continuity, but the highest likelihood of success.

By way of non-limiting example, RRM-corrective actions can be predefined for a case 602 when the obtained values of the predefined set of inputs are indicative of SLA violation for the leading service. In the illustrated example, RRM-corrective actions are required for restoring compliance with SLA and can be predefined to enable the following results:

restoring eCall SLA compliance (e.g. for improving accessibility of circuit switch connection) can be enabled by a forced (via RRC modification) handover (intra-RAT, inter-RAT or inter-band) to a desired cell capable of providing eCall service in accordance with SLA requirements;

restoring SLA compliance for V2N-based services (e.g. violated due to 2G-RAT camping) can be enabled by TCU-based selection of a preferred network that supports V2N services (e.g. 4G-RAT);

restoring data call SLA compliance can be enabled by TCU-based termination of connection to the current RAT, thus enabling selection of a desirable cell (typically in later RAT) capable to provide throughput and packet loss in accordance with a respective SLA;

forced (via RRC modification) inter-RAT handover (possibly 4G-→3G) can be enabled for restoring SLA compliance for telematic services sensitive to latency;

network-based (via RRC modification) termination of connection can be enabled for restoring SLA compliance for infotainment services; and TCU-based selection of a preferred network can be enabled for restoring SLA for FOTA (Firmware Over-The-Air) services.

By way of another non-limiting example, RRM-corrective actions can be predefined for a case 603 when, in accordance with the predictive model and the values of the predefined set of inputs, the quality of the leading service can be significantly improved by applying RRM-corrective actions. RRM-corrective actions in case 603 can differ from corrective actions in case 602. For some services (e.g. eCalls and V2N connectivity) they may not exist.

Referring back to FIG. 5, when it is decided (504) that the required RRM-corrective action is of a network-based type, telematic system 200 (e.g. PMC 301) uses the most updated weighting matrix and the obtained values of the predefined set of inputs to modify (505) the RRC report so as to force a desired corrective action. Further, following procedures defined by respective cellular standards, telematic system (e.g. RF unit 341) sends (506) one or more modified RRC reports to a respective serving cell. The one or more RRC reports comprise the modified values instead of the measured values, thereby network-based RRM-corrective action enables the desired changes of radio connectivity.

In accordance with certain embodiments of the presently disclosed subject matter, RRM module 304 can be configured to receive from RF unit 341 data informative of RAT-related measurements and receive from respective ECUs (and/or directly from external system(s)) data informative of current location, speed and currently activated service(s). RRM module 304 can be further configured to apply the weighting matrix to the received data and to calculate, accordingly, the modified values to be reported in the RRC report. RRM module 304 sends data informative of modified values to RF unit 341. Chipset 342 further uses the received modified values to send RRC report(s) to an appropriate entity in the cellular network (e.g. to eNode). It is noted that chipset 342 sends the RRC report(s) as defined by respective cellular standard(s), whilst replacing (when so instructed by RRM module 304) the measured values by the modified values.

It is noted that in some cases, depending on the weighting matrix and the values of the predefined set of inputs, the modified values can be the same as the measured values. In certain embodiments, RRM module 304 can send to chipset 342 the modified values regardless of whether the modified values differ from the measured values. In other embodiments, RRM module 304 can send to chipset 342 the modified values only when the modified values differ from the measured values.

Calculating the modified values f (RAT-measurements, Speed, Location, Service) can be provided as follows:

$$f(RAT-\text{measurements, Speed, Location, Service}) = \begin{bmatrix} W11 & \ldots \\ \ldots & Wnn \end{bmatrix} *$$

$$[RAT-\text{measurements}] * \begin{bmatrix} MS11 & \ldots \\ \ldots & MSnn \end{bmatrix} * [\text{speed}] * [\text{location}] *$$

$$\begin{bmatrix} Service_0 \\ \ldots \\ Service_n \end{bmatrix} * [\text{speed}] * [\text{time}]$$

In the exemplified equation above, $[\begin{smallmatrix} W11 & \\ & Wnn \end{smallmatrix} \ldots]$ is the weighing matrix; [RAT-measurements] is the matrix with data informative of RAT-related measurements of the serving cell; $[\begin{smallmatrix} MS11 & \\ & MSnn \end{smallmatrix} \ldots]$ is the matrix with data informative of RAT-related measurements of the surrounding cells; [speed], [location], [time] and $$\begin{bmatrix} Service_0 \\ \ldots \\ Service_n \end{bmatrix}$$

are current values of speed, location, time and data informative of currently activated services.

Thus, applying the weighing matrix to the current values of the predefined set of inputs provides the values for the modified RRC report and enables RRM-corrective actions in accordance with the vehicle's location, speed and activated service(s).

Figure 7:
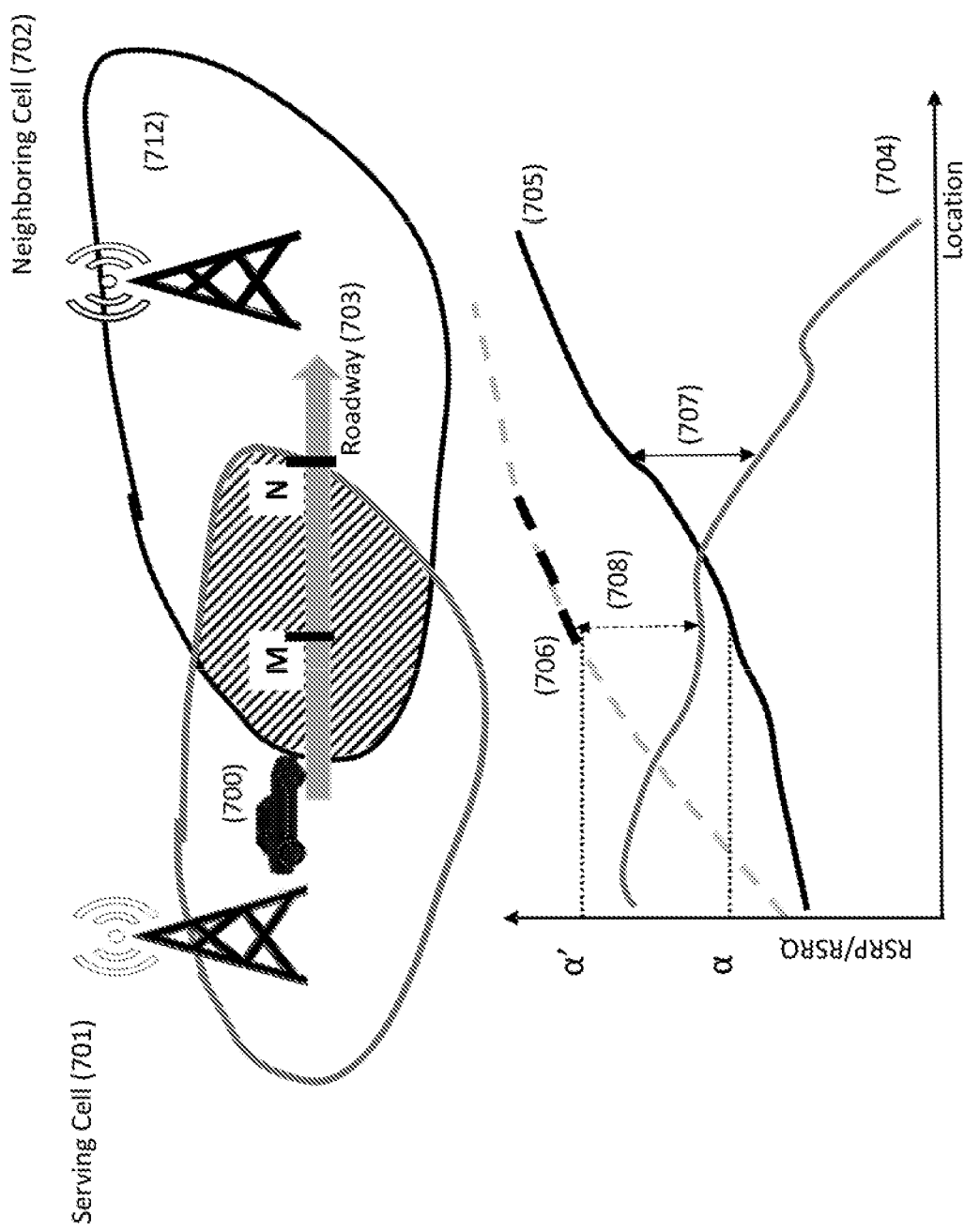
FIG. 7 schematically illustrates a simplified example of forcing an intra-RAT handover in accordance with certain embodiments of the currently presented subject matter.

Referring to FIGS. 7-8, there are provided schematic simplified examples of handover enabled by the modified RRC report.

FIG. 7 schematically illustrates a simplified example of forcing an intra-RAT handover in accordance with certain embodiments of the currently presented subject matter.

As illustrated, a vehicle 700 is driving along the roadway 703 from a serving cell 701 with footprint 711 towards a neighbouring cell 702 with footprint 712. For illustration purposes, both cells are considered as operating in the same RAT (e.g. 3G), while cell 702 is considered as desirable (e.g. a micro cell enabling enhanced data services).

Cell 701 broadcasts the signal (denoted 704) with power level reducing as vehicle 700 moves away from cell 701, and cell 702 broadcasts the signal (denoted 705) with power level increasing as the vehicle approaches cell 702.

As detailed above, telematic system 200 is capable of measuring RAT-related data (e.g. RSRP, RSRQ, etc.) informative of the broadcasted signals. In accordance with respective cellular standards, the cellular network should trigger handover from cell 701 to cell 702 when a difference between the signal values, as reported by the telematic system, achieves a predefined handover threshold. Such handover should occur at point N when the difference 707 between the signal values is expected to achieve the handover threshold.

In accordance with certain embodiments of the presently disclosed subject matter, responsive to a predefined event (e.g. change of location bin at point M) telematic system can apply the predictive model to the current values of the predefined set of inputs. In accordance with the results, telematic system modifies the reported measurements so that the reported difference 708 between the signals meets the handover threshold already at point M. In the illustrated example, telematic system 200 instead of the measured value α of signal 705 reports the modified value α' of a "virtual" signal 706, thereby forcing the desired handover about point M (considering handover hysteresis). Thus, already substantially from point M the telematic system will be served by cell 702 as desired for the leading service. Those skilled in the art will readily appreciate that, likewise, telematic system 200 can modify and report the modified values of signals 704 and 705 (and signals from other cells if measured) so that the reported difference (offset) between the signals 704 and 705, and only this difference between these signals meets the handover threshold.

Figure 8A:
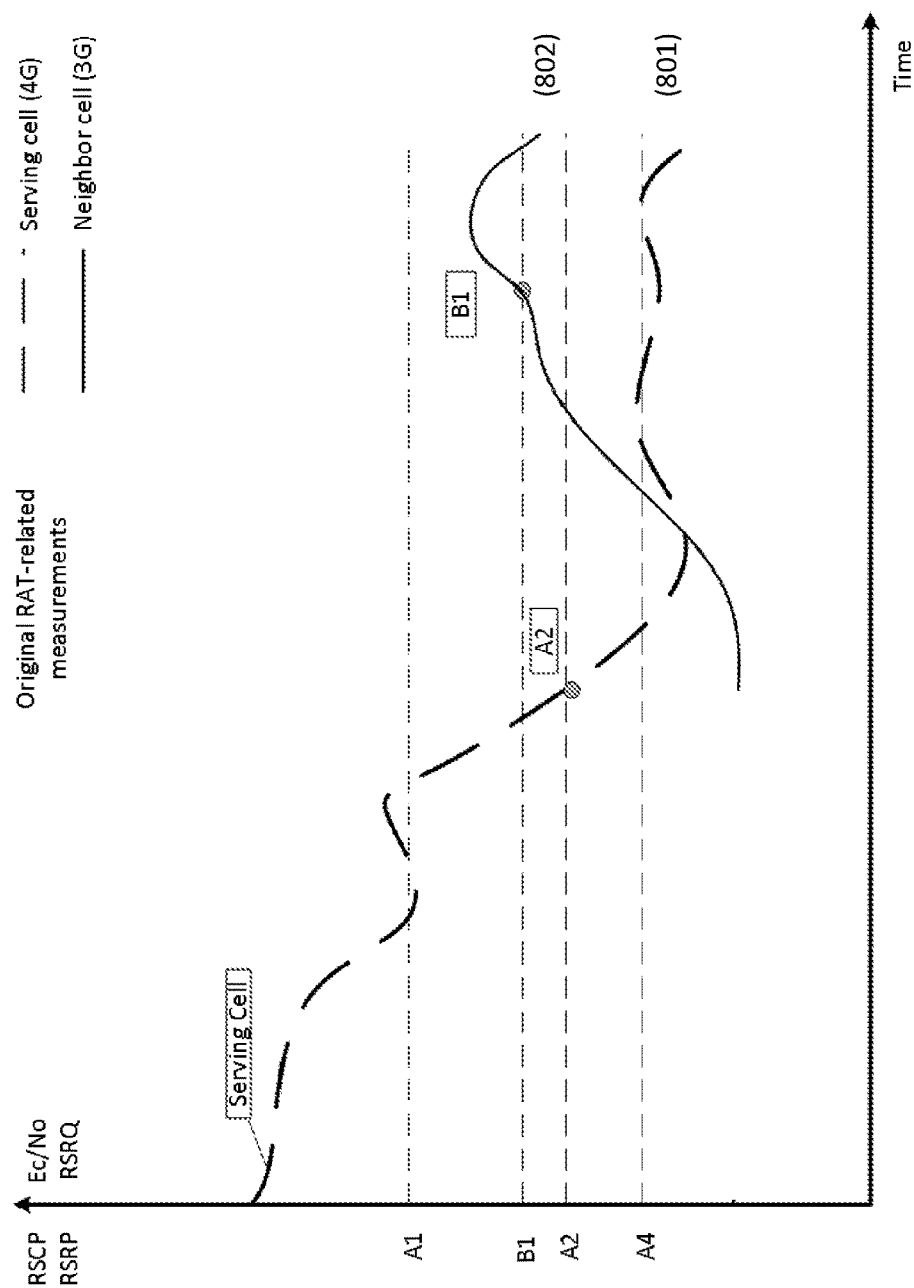
FIGS. 8a-8b schematically illustrate a simplified example of forcing an inter-RAT handover in accordance with certain embodiments of the currently presented subject matter.
Figure 8B:
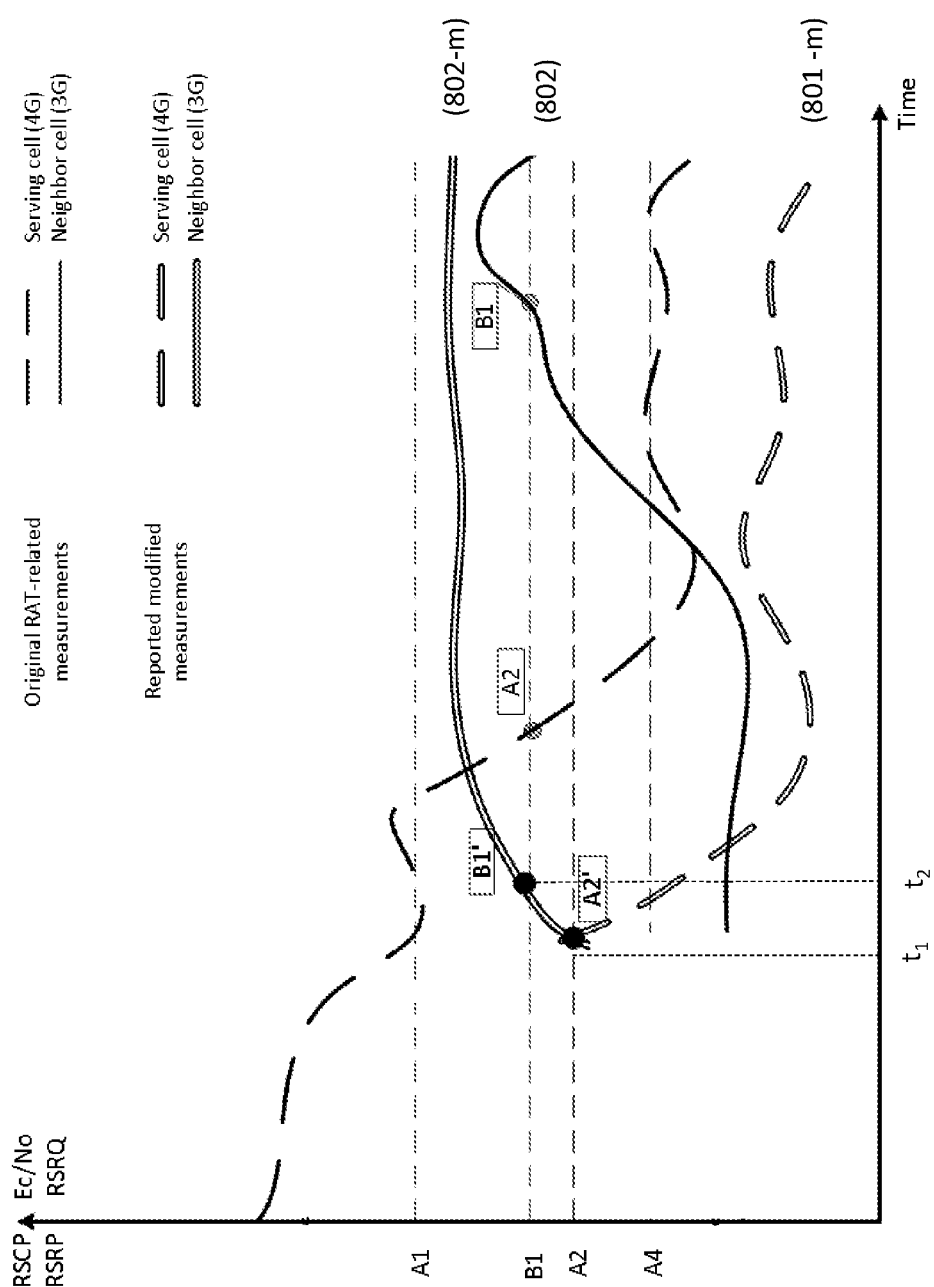

FIGS. 8a-8b schematically illustrate a simplified example of forcing an inter-RAT handover in accordance with certain embodiments of the currently presented subject matter. For illustration purposes, the currently serving cell is considered as operating in 4G while the desirable RAT is considered as 3G (e.g. due to better achievable latency).

When operating in accordance with 3GPP Long Term Evolution (LTE) standard, chipset 342 can send RRC reports periodically or based on events as specified by the standard:
 A1: serving becomes better than threshold;
 A2: serving becomes worse than threshold;
 A3: neighbour becomes offset better than PCell;
 A4: neighbour becomes better than threshold;

A5: PCell becomes worse than threshold1 and neighbour becomes better than threshold2;
A6: Neighbour becomes offset better than S-Cell
C1: CSI-RS resource becomes better than threshold
C2: CSI-RS resource becomes offset better than reference CSI-RS resource;
B1: Inter RAT neighbour becomes better than threshold;
B2: PCell becomes worse than threshold1 and inter RAT neighbour becomes better than threshold2

FIG. 8a illustrates the timeline of the respective events which could occur for a moving vehicle if no RRM-corrective actions have been provided. Line 801 illustrates the time dependency of the signal (e.g. values of RSCP, RSRP, RSRQ, EcNo, etc.) of the serving cell A operating in 4G, and line 802 illustrates the time dependency of the signal of the neighbouring cell B operating in 3G. Signals 801 and 802 are measured and reported by telematic system (e.g. chipset 342) in a regular manner defined by a respective cellular standard (signals measured and reported from other cells are not shown for simplicity of illustration). It is noted that, typically, telematic system (e.g. cellular chipset) does not start measurement of surrounding cells before the signal from the serving cell reaches the threshold configured for A2 event. Handover from the cell A to cell B occurs after event B1 (i.e. after inter-RAT neighbour becomes better than the serving cell whilst proper intra-RAT cells are absent or their signals are sufficiently low).

FIG. 8b illustrates the timeline of events as they occur with RRM-corrective actions provided in accordance with certain embodiments of the currently presented subject matter. Likewise, in FIG. 8a, line 801 illustrates the time dependency of the RAT-related data informative of the signal from the serving cell A, and line 802 illustrates the time dependency of the RAT-related data informative of the signal from the neighbouring cell B. Signals 801 and 802 are measured by the telematic system, but are not reported as measured.

Responsive to a predefined event (e.g. change of location bin at time $t_1$), telematic system applies the predictive model to the current values of the predefined set of inputs. Thus, telematic system, implicitly or explicitly, defines that it is desired for the leading service to be served by cell B. In accordance with the applied predictive model, RRM module 304 modifies the measurements of serving cell to be reported by chipset 342 so to be lower than A2 threshold, thereby causing the chipset 342 to send RRC report corresponding to event A2 (denoted as A2').

Responsive to event A2', chipset 342 starts measuring signals from the surrounding cells. Upon measuring, RRM module 304 modifies the values to be reported as follows: values to be reported for the currently serving cell (cell A) are modified to be lower than B1 threshold; values to be reported for the desired cell (cell B) are modified to be higher than B1 threshold; and values to be reported for the other surrounding cells are modified to be lower than any of A3, A4 and A5 thresholds. Accordingly, chipset 342 sends (at time t2 defined by respective cellular standards) RRC report corresponding to B1 event (denoted as B1'), thus causing the cellular network to initiate inter-RAT handover to the desired cell B about time t2. The modified measurements from cell A are denoted as 801-*m*, and the modified measurements from cell B are denoted as 802-*m*. Measured and modified signals from other cells are not shown for simplicity of illustration. It is noted that the signals can be modified so that respective offsets correspond to A2 and B1 events, respectively.

Similar to the example illustrated in FIG. 8b, RAT-related data of undesired RAT (e.g. in case of camping on an earlier RAT) can be modified so to be reported below a radio link failure threshold. As a result, the cellular network will drop the connection and further will automatically trigger the telematic system to re-select the cell. Most likely, the re-selected cell will be of later RAT, as desired.

It is noted that the modified signals 801-*m* and 802-*m* are illustrated as continuous lines for simplicity of illustration only. In accordance with cellular standards, in many cases the cellular network requires, for a given event, a plurality of reports to be provided during a triggering period of the given event. For purpose of simplification of illustration only, the example presents for each event only single report instead. It is noted that in accordance with certain embodiments of the presently disclosed subject matter, the telematic system keeps all messages, commands, measurement and report formats as defined by respective cellular standards, whilst initiating and reporting the modified values instead of the measured values.

Referring back to FIG. 5, upon deciding (504) that the required RRM-corrective action is of TCU-based type, telematic system 200 uses the predictive model and the obtained values of the predefined set of inputs to generate (507) instructions for TCU-based RRM-corrective actions. Among TCU-based corrective actions are enabling TCU-based termination (508) of connection and enabling selection (509) of a preferred network.

When enabling TCU-based termination (e.g. in cases of camping on earlier RAT), the RRM-module can instruct the chipset 342 to break all communication (similar to airplane mode of a cellular phone). Further, RRM-module can instruct the chipset 342 to return to active mode, thus initiating the re-selection process. Most likely, the re-selected cell will be of later RAT, as desired.

In order to enable selecting a preferred network (e.g. for camping on the latest RAT), RRM module can instruct the cellular chipset 342 (via respective API) to select the preferred network in accordance with the predictive model, thereby to lock onto the desired RAT. The selection can be provided automatically or via a user interface with involvement of a user.

It is noted that, in certain embodiments, the telematic system can be configured to provide only network-based RRM-corrective actions, or only TCU-based corrective actions. In such cases, operations (503) and (504) are not necessary. Likewise, in a case of predefined corrective actions, operations (503) and (504) can be replaced by an operation of selecting the predefined corrective action in accordance with values of the predefined set of inputs.

Figure 9:
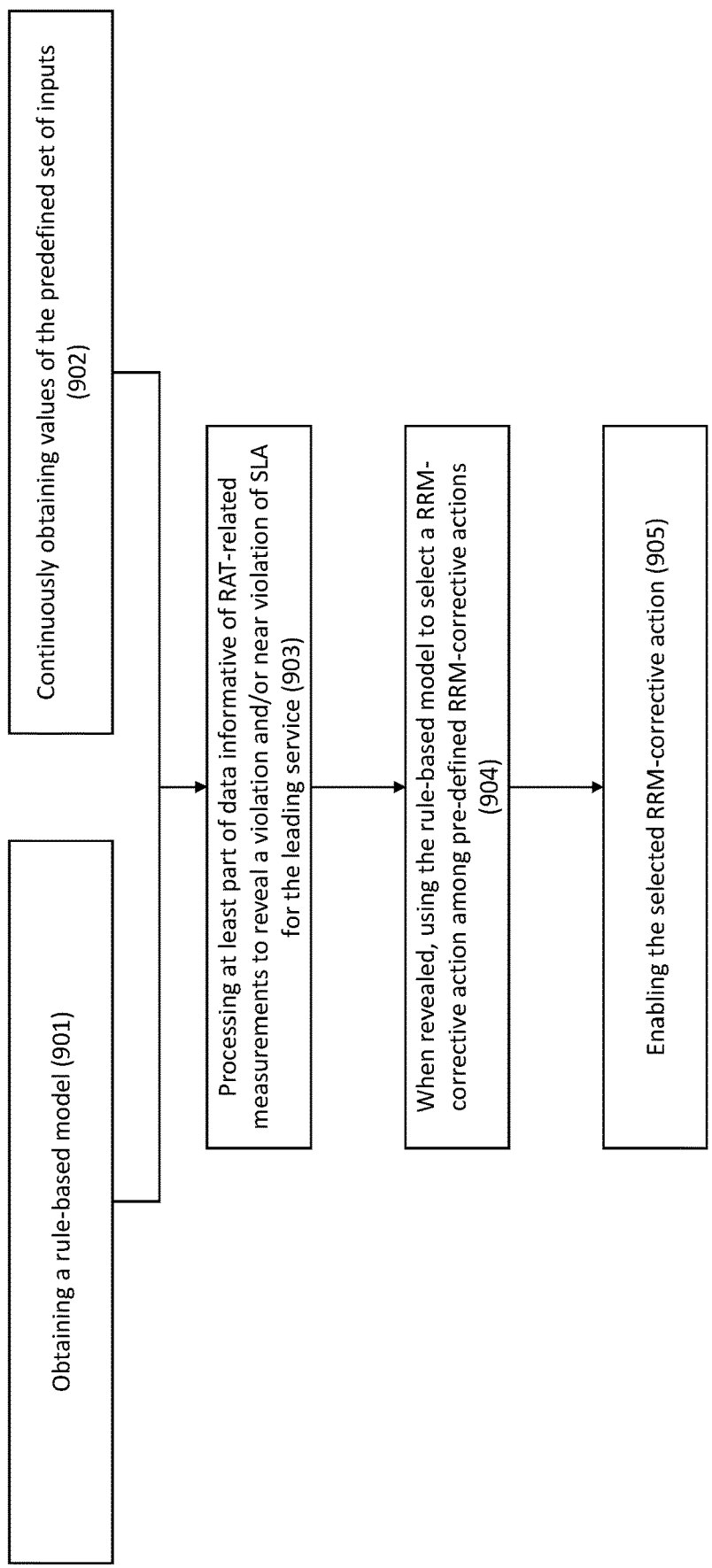
FIG. 9 illustrates a generalized flow chart of alternative operating of the telematic system in accordance with certain embodiments of the presently disclosed subject matter.

Referring to FIG. 9, there is illustrated a generalized flow chart of operating the telematic system in accordance with alternative embodiments of the presently disclosed subject matter.

Telematic system can obtain (901) rule-based model pre-defining RRM-correction actions and rules of selecting thereof. Such a rule-based model can be saved in memory 303.

Likewise described above with reference to FIGS. 4-8, telematic system can continuously obtain (902) values of a predefined set of inputs (e.g. data informative of location of the vehicle, activated services and RAT-related measurements). Telematic system (e.g. PMC 301) processes at least part of data informative of RAT-related measurement to reveal (903) violation or near violation of SLA with regard to a leading service. When revealed, telematic system uses the rule-based model to select (904) a RRM-corrective action among the actions predefined by the rule-based model. The predefined RRM-corrective actions can include:

modifying the RRC measurement report to report measurements below a radio link failure threshold, thereby forcing the cellular network to terminate the connection and to enable automatic re-selecting the desirable RAT;

terminating the respective connection by the telematic system, thus enabling further RAT re-selection in idle mode; and using the chipset API to enable selecting a network predefined as "preferred" for a given service.

The rule-based model defines which RRM-action shall be selected in accordance with the leading service and SLA status (violation/near violation). Telematic system further enables the selected RRM-corrective action in a manner detailed with reference to FIGS. 5-8.

Further to the capabilities detailed above, telematic system 200 can be configured to temporally prevent radio connectivity necessary for initiating a communication-related service. Typically, when a connectivity is initiated at a road segment with 2G connectivity only (or with very poor 3G-4G connectivity as, for example, in the tunnels), most likely that the connectivity will be camped to 2G RAT even when later RAT becomes available. In accordance with certain embodiments of the presently disclosed subject matter, at such segments telematic system 200 can delay initiating respective connectivity with the cellular network. The delay can be provided when time required to the vehicle to achieve a network segment with available desired RAT is estimated as lower than a threshold time of allowable delay of providing the service. The delay instructions can be obtained as a result of applying the predictive model which is aware of road segments with a risk of 2G camping. Alternatively, telematic system 200 can be configured to provide the required estimations using a respectively configured digital map of the cellular network, such map can be stored in memory 303. Threshold time of allowable delay of each given service can be stored in memory 303 and/or can be comprised in the predictive module as configurable parameter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of managing radio connectivity of a vehicle comprising a telematic system, the method comprising:

continuously receiving by the telematic system a predictive model generated by a remote system using data continuously collected from a plurality of vehicles, wherein the collected data comprise, for each given vehicle of the plurality of vehicles, data informative of its location, speed and of Radio Access Technology (RAT)-related measurements provided by telematic system of the given vehicle; and responsive to a predefined event, applying, by the telematic system, a lastly received predictive model to current values of a predefined set of inputs associated with the vehicle to generate instructions and respectively provide one or more corrective actions related to radio connectivity of the vehicle, wherein the predefined set of inputs comprises a currently activated leading communication-related service characterized by the highest priority among activated communication-related services, and wherein the one or more corrective actions are provided in correspondence with the currently activated leading communication-related service, wherein the one or more corrective actions are selected from the group consisting of:

a. modifying one or more Radio Resource Control (RRC) measurement reports so as to force intra-RAT handover or inter-RAT handover;

b. modifying one or more RRC measurement reports so as to exclude available connectivity with undesired RAT or band;

c. modifying one or more RRC measurement reports so as to force the cellular network to terminate the radio connectivity and to enable automatic RAT re-selecting;

d. terminating the radio connectivity by the telematic system thus enabling further RAT re-selecting; and e. enabling selecting a network predefined as "preferred" for an activated service.

2. The method of claim 1, wherein the predefined set of inputs comprises location of the vehicle, its speed, a currently activated leading communication-related service characterized by the highest priority among activated communication-related services, and RAT-related measurements provided by the vehicle.

3. The method of claim 2, wherein the predefined set of inputs further comprises data informative of Service Level Agreement (SLA) violation or near SLA violation for the currently activated leading service.

4. The method of claim 1, wherein the predefined event is selected from the group consisting of changes of RAT and/or band characterizing radio connectivity of the vehicle, activation/deactivation of a communication-related service provided to the vehicle, change of a location bin, SLA violation and near SLA violation for the currently activated leading service.

5. The method of claim 1, wherein, for at least one leading service, the one or more corrective actions are predefined in correspondence with the current values of the predefined set of inputs.

6. The method of claim 1, wherein the corrective actions are predefined for a case when the current values of the predefined set of inputs are indicative of SLA violation for the currently activated leading service.

7. A vehicle telematic system to manage radio connectivity of a vehicle, the telematic system comprising a processor and memory circuitry (PMC), wherein the PMC is configured to:

continuously receive a predictive model generated by a remote system using data continuously collected from a plurality of vehicles, wherein the collected data comprise, for each given vehicle of the plurality of vehicles, data informative of its location, speed and of Radio Access Technology (RAT)-related measurements provided by telematic system of the given vehicle; and responsive to a predefined event, apply a lastly received predictive model to current values of a predefined set of inputs associated with the vehicle to generate instructions and respectively provide one or more corrective actions related to radio connectivity of the vehicle, wherein the predefined set of inputs comprises a currently activated leading communication-related service characterized by the highest priority among activated communication-related services and wherein the one or more corrective actions are provided in correspondence with the currently activated leading communication-related service, wherein the one or more corrective actions are selected from the group consisting of:

a. modifying one or more Radio Resource Control (RRC) measurement reports so as to force intra-RAT handover or inter-RAT handover;

b. modifying one or more RRC measurement reports so as to exclude available connectivity with undesired RAT or band;

c. modifying one or more RRC measurement reports so as to force the cellular network to terminate the radio connectivity and to enable automatic RAT re-selecting;

d. terminating the radio connectivity by the telematic system thus enabling further RAT re-selecting; and e. enabling selecting a network predefined as "preferred" for an activated service.

8. The system of claim 7, wherein the predefined set of inputs comprises location of the vehicle, its speed, a currently activated leading communication-related service characterized by the highest priority among activated communication-related services, and RAT-related measurements provided by the vehicle.

9. The system of claim 8, wherein the predefined set of inputs further comprises data informative of Service Level Agreement (SLA) violation or near SLA violation for the currently activated leading service.

10. The system of claim 7, wherein the predefined event is selected from the group consisting of changes of RAT and/or band characterizing radio connectivity of the vehicle, activation/deactivation of a communication-related service provided to the vehicle, change of a location bin, SLA violation and near SLA violation for the currently activated leading service.

11. The system of claim 7, wherein, for at least one leading service, the one or more corrective actions are predefined in correspondence with the current values of the predefined set of inputs.

12. The system of claim 7, wherein the corrective actions are predefined for a case when the current values of the predefined set of inputs are indicative of SLA violation for the currently activated leading service.

* * * * *